United States Patent [19]
Rusher, Jr.

[11] Patent Number: 5,284,218
[45] Date of Patent: Feb. 8, 1994

[54] MOTORIZED CART WITH FRONT WHEEL DRIVE

[75] Inventor: James T. Rusher, Jr., Badin, N.C.

[73] Assignee: Rusher Corporation, Badin, N.C.

[21] Appl. No.: 34,080

[22] Filed: Mar. 22, 1993

[51] Int. Cl.$^5$ .................... B62D 51/04; B62B 3/00
[52] U.S. Cl. ..................... 180/19.1; 180/19.3; 298/2
[58] Field of Search ............... 180/19.1, 19.2, 19.3; 298/2, 3

[56] References Cited

U.S. PATENT DOCUMENTS

| | | | |
|---|---|---|---|
| 2,638,172 | 5/1953 | Borchin et al. | 180/19.1 |
| 2,918,133 | 12/1959 | Ericsson | 180/19.1 |
| 3,421,647 | 1/1969 | Seymour | 180/19.1 |
| 3,485,314 | 12/1969 | Herr | 180/19.1 |
| 3,525,099 | 8/1970 | Fuhrmann | 298/2 |
| 3,791,470 | 2/1974 | Baddore et al. | 180/19.1 |
| 3,840,077 | 10/1974 | Smith | 180/19.1 |
| 3,891,043 | 6/1975 | Valdex | 180/13 |
| 4,589,508 | 5/1986 | Hoover et al. | 180/19.1 |
| 4,645,264 | 2/1987 | Morrison | 180/19.1 |
| 4,811,988 | 3/1989 | Immel | 298/2 |
| 5,106,113 | 4/1992 | Piacentini | 298/2 |
| 5,149,116 | 9/1992 | Donze et al. | 298/2 |

Primary Examiner—David M. Mitchell
Assistant Examiner—Kevin Hurley
Attorney, Agent, or Firm—Bell, Seltzer, Park & Gibson

[57] ABSTRACT

A wheeled cart for facilitating the transportation and delivery of a load of material including an elongated frame having a pair of drive wheels mounted to the forward end of the frame and a pair of caster wheels operatively engaged with and supporting the rear end of the frame. A hopper attached to the upper side of the frame and suitable for carrying and dumping a load. A motive means mounted on the frame adjacent to the forward end of the frame and a drive means connecting the motive means and the drive wheels. A handle is connected to and extends rearwardly and upwardly from the rear of the frame and has control means attached thereto and connected to the motive means for controlling the forward and rearward movement of the cart and for stopping the cart.

7 Claims, 3 Drawing Sheets

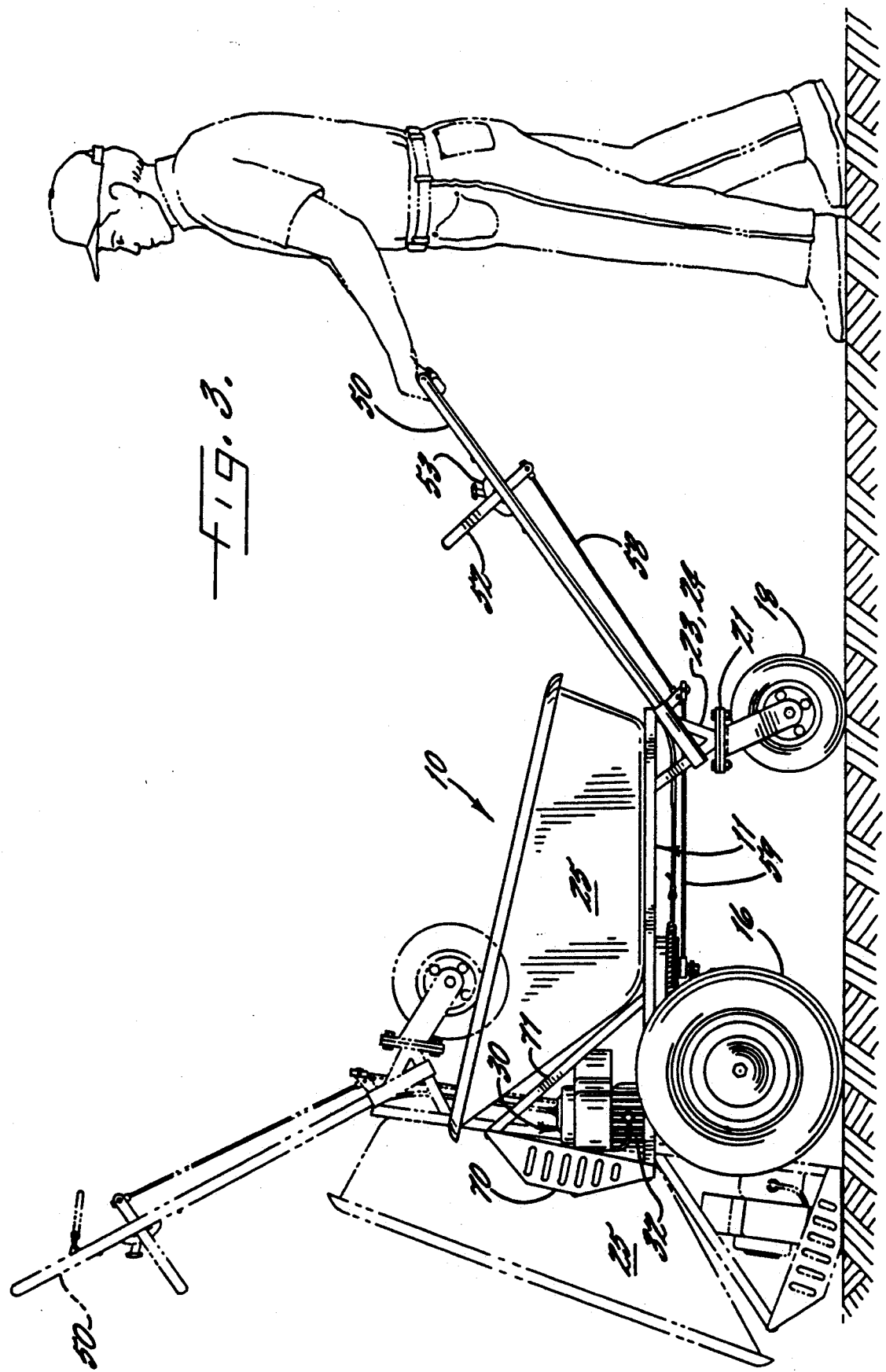

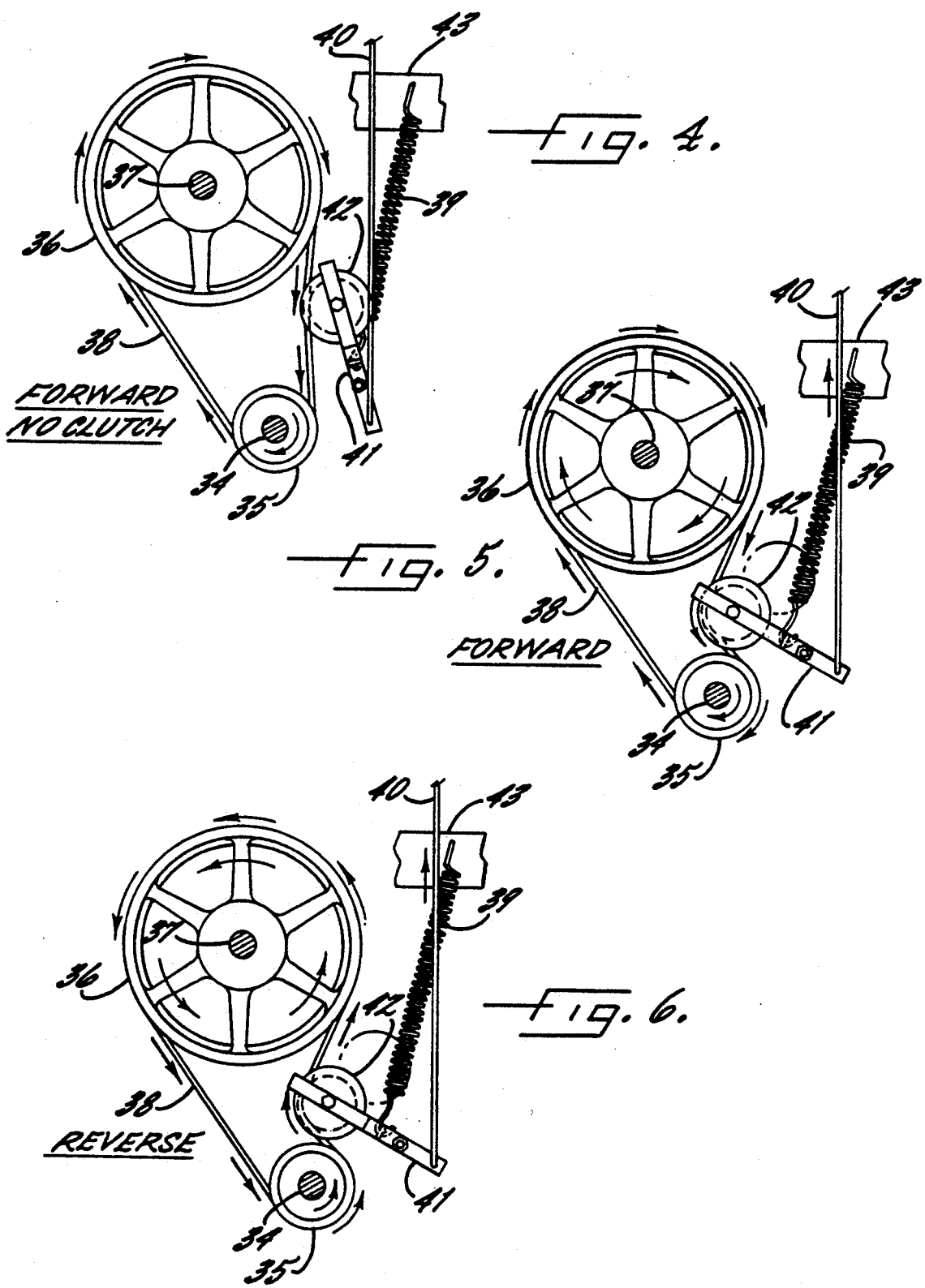

MOTORIZED CART WITH FRONT WHEEL DRIVE

BACKGROUND OF THE INVENTION

1. Field of the Invention

The present invention relates to motorized carts for the transportation and delivery of a load of material. More particularly, the present invention relates to motorized carts with front wheel drive for moving and dumping heavy loads.

2. Description of the Prior Art

Various types of carts and wheelbarrows have for years been found useful for transporting heavy loads. Single wheeled barrows are particularly useful in a variety of settings. Typically, while in use, the wheelbarrow's load is balanced over the wheel. As a result, the user of the wheelbarrow is not required to bear the weight of the entire load. The load, rather, is merely lifted until its weight pivots over the wheel sufficiently to place a substantial amount of the weight on the wheel. While this mechanism is effective for many uses for transporting small but heavy loads, the load may become unbalanced or where the wheelbarrow is moved over soft or rough terrain the heaviness of the load may cause a wheelbarrow to bog down or become difficult to move.

Various attempts to assist the user of wheelbarrows in carrying loads over rough terrain have been made by adding power drives to single wheeled wheelbarrows. One such example is shown in U.S. Pat. No. 2,638,172 and another in U.S. Pat. No. 4,589,508 wherein there is shown single wheeled wheelbarrows each having a motor located toward the rear of the load carrying bed. A disadvantage of these types of motorized wheelbarrow is that the motor is located to the rear of the wheel resulting in a burden on the user to lift the motor while moving the wheelbarrow from place to place. When the wheelbarrow is dumped over the wheel, the weight of the motor remains a cantilevered burden which must be raised up to a position in which it becomes top-heavy when the load slides out of the hopper or pan, progressively reducing the "ballast" as the wheelbarrow approaches the vertical. Additionally, because the motor is located below the bottom of the wheelbarrow pan it is close to the ground and must be lifted to prevent hitting any projections, such as stones, bricks or other debris which may be in the path of travel.

There have also been proposed motorized wheelbarrows which have a motor located close to the wheel. One such device is shown in U.S. Pat. No. 3,791,470. These devices also have similar deficiencies of single wheeled vehicles.

There is shown in U.S. Pat. No. 4,811,988 a four wheeled load carrier which has a motor located near the rear axle. Because of the difficulty of raising the entire device to dump the load there is provided a separately detachable frame for carrying a load pan or hopper engaged with and hinged to the main frame at the forward end to be tipped forward to unload the pan. The weight of the motor means that an additional frame is needed to support the barrow for dumping. Also of note is U.S. Pat. No. 2,918,133 which discloses a cart having a rear mounted motor the hopper of which is hingedly connected to the frame in a manner to forwardly tilt and dump the load.

It is, therefore, the general object of the present invention to provide a motorized cart for transporting and delivering a load of material from one location to another.

Another object of this invention is to provide a motorized cart in which the load carrying hopper or pan can be moved from a stable position for transporting the load to a position where the load can be dumped without lifting the entire weight of the load and the motive means and in which the cart remains stable during dumping.

Yet another object of this invention is to provide a motorized cart having the motive means in a raised location protected from damaging contact with objects projecting from the path of travel such as stones, bricks, stakes and the like.

A still further object of this invention is to provide a motorized cart having a pair of front drive wheels providing stable side to side balance when the cart is moved over uneven terrain or when the load shifts.

The foregoing and other objects, advantages and features of this invention, and the manner in which the same are accomplished will become more readily apparent upon consideration of the following detailed description of the invention taken in conjunction with the accompanying drawings, which illustrate preferred and exemplary embodiments.

SUMMARY OF THE INVENTION

The present invention is a wheeled cart for facilitating the transportation and delivery of a load of heavy material which includes an elongated frame having a pair of front or drive wheels mounted to the forward end of the frame and supporting the forward end of the frame. The front or drive wheels are of such size as to provide good traction to move heavy material and are preferably from 6" diameter to about 12" diameter. These wheels are preferably located outside of the frame to stabilize the load from side to side movement. Additionally, by locating the wheels outside of the frame the center of gravity of the load is not so high as to cause the cart to be top heavy.

A pair of rear wheels are provided which enable the cart to be easily turned. The rear wheels which may preferably be caster wheels are operatively engaged with and support the rear end of the frame. The caster wheels are preferably smaller than the drive wheels and easily swivel to change direction of the cart.

A hopper or pan is attached to the upper side of the frame. The hopper may be of a variety of sizes and shapes depending upon the particular use of the cart. However, the hopper must be capable of carrying and dumping a load. Further, the hopper has a portion of the weight of the load located above and over the drive wheels to facilitate dumping the load. A preferred shape of the hopper is a pan-like shape having generally outwardly sloping sides and front.

The motive means is preferably a motor, such as gasoline powered motor, mounted to the frame adjacent to and above the drive wheels at the forward end of the frame with the weight of the motive means above the drive wheels. The motive means includes a motor and drive means connecting the motor to the drive wheels.

A handle is connected to and extends rearwardly and upwardly from the frame. The handle may be two elongated members such as found on a conventional wheelbarrow but preferably it has a U-shape. Control means attached to the handle are provided and are connected to the motive means. The control means includes means for controlling the forward and rearward operation of the cart and for stopping the movement of the cart.

The cart also includes a load dumping bumper located forward of the frame whereby a portion of the weight of the cart and the load may rest thereon when a load is dumped and whereby the motive means is protected from bumping and the like.

BRIEF DESCRIPTION OF THE DRAWINGS

FIG. 3 is a side elevation of the motorized cart of the present invention also illustrating the load carrying member in phantom in a load dumping position;

FIG. 4 is a fragmentary view illustrating the drive means of the present invention engaged to effect forward movement of the cart without the clutch being engaged;

FIG. 5 is a fragmentary view illustrating the drive means of the present invention engaged to effect forward movement of the cart; and FIG. 6 is a fragmentary view illustrating the drive means of the present invention engaged to effect forward movement of the cart.

DETAILED DESCRIPTION OF THE PREFERRED EMBODIMENTS

Figures 1, 2:
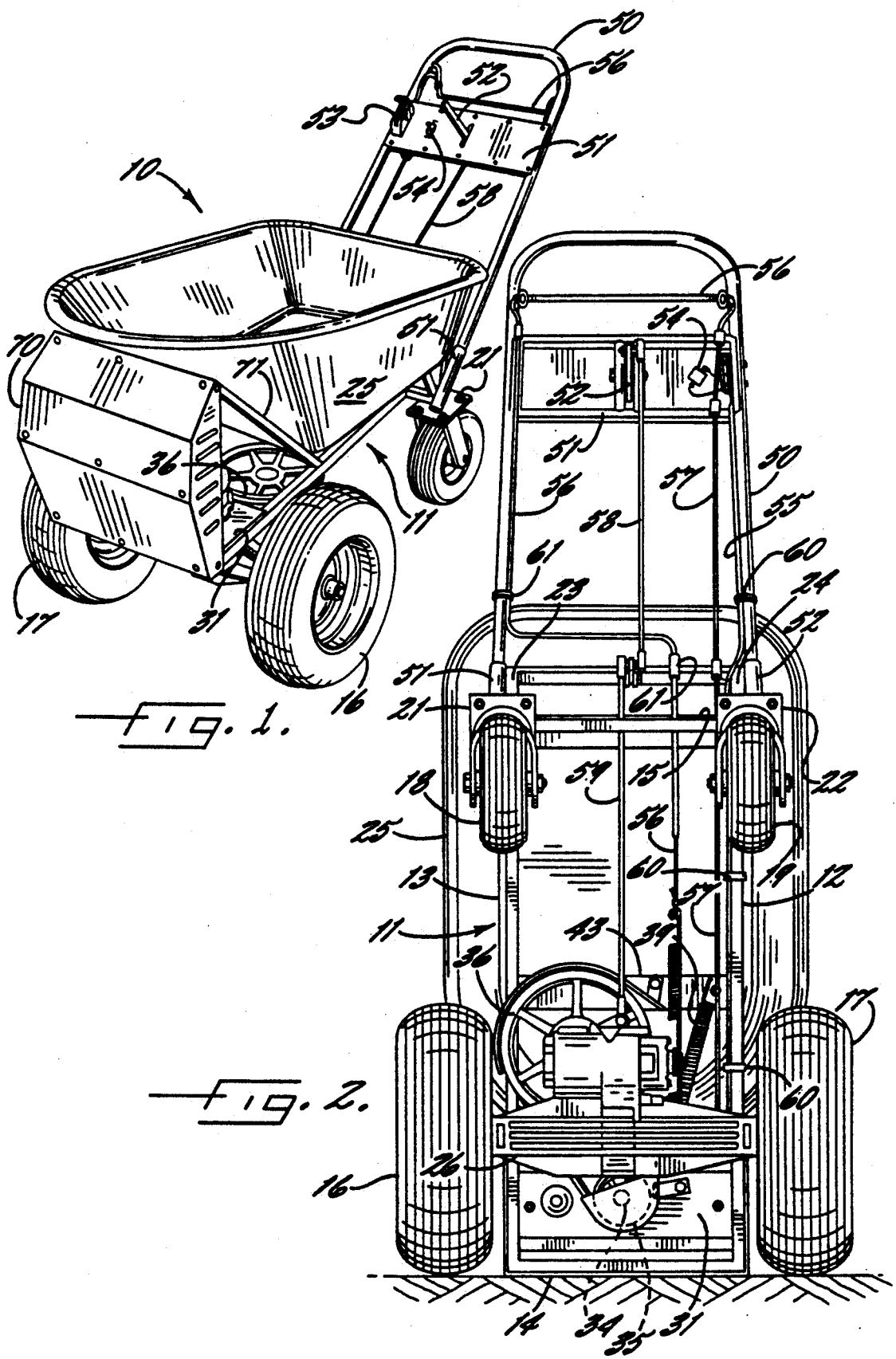
FIG. 1 is a perspective view showing the motorized cart of the present invention.
FIG. 2 is a bottom elevation view of the motorized cart of the present invention.

Referring first to FIG. 1, there is shown the motorized cart of the present invention identified generally by reference 10, in use by an operator, transporting material. The present invention is a wheeled cart for facilitating the transportation and delivery of a load of heavy material which includes an elongated frame having a pair of front wheels or drive wheels 16, 17 mounted to and supporting the forward end of the frame 11 and a pair of rear wheels 18, 19 mounted to and supporting the rear of the frame. The cart is powered by motive means 30.

The elongated rigid frame 11 is formed by longitudinal side members 12, 13 and transverse front member 14 and rear member 15. The front member 14 and rear member 15 are rigidly affixed to the ends of longitudinal side members 12, 13. The frame may be comprised of angle iron or square tubing or similar material.

As seen most clearly in FIG. 2, an axle housing is mounted to the frame near traverse front member 14 for supporting an axle 26 on which the two drive wheels 16, 17 are mounted. The axle 26 being located directly below the frame, enables the use of relatively large drive wheels. Thus, when the cart is being used in a location where there is a lot of debris the height of the frame from the ground enables the cart to pass over the debris without interference. The drive wheels 16, 17 are of such size as to provide good traction to move a heavy material, preferably from 6" diameter to about 12" diameter. It is desirable to locate the drive wheels outside of the frame 11 to stabilize the hopper against side to side movement of the load to prevent tilting of the cart. Additionally, by locating the drive wheels outside of the frame the width between the wheels stabilizes the relatively high center of gravity of the cart hopper when the drive wheels are relatively large.

The rear wheels, preferably caster wheels 18, 19, are provided to enable the cart to be easily turned and maneuvered. The caster wheels are operatively engaged with and support the rear end of the frame. As shown, the caster wheels are attached to support plates 21, 22 which are integral with caster support mounts 23, 24 attached to longitudinal members 12, 13 proximate rear traverse member 15. The castor wheels are sufficiently smaller than the drive wheels so that when they are fitted beneath the frame the hopper is relatively level. It should be understood, of course, that this invention does not require that the ratio of drive wheels to caster wheel size be such that the hopper is level, it is just preferred.

A hopper or pan 25 is attached to the upper side of the frame 11. The hopper 25 may be of a variety of sizes and shapes depending upon the particular use of the cart. However, the hopper must be capable of carrying and dumping a load. Further the hopper has a portion of the weight of the load is located above and over the drive wheels to facilitate dumping the load. One such hopper arrangement of wide practical use is shown in FIGS. 2 and 3. As shown, the hopper has an open top and generally outwardly sloping sides and front. The front, as shown, in FIG. 3, slopes forward above and over the motive means to facilitate the dumping of a load. Using the design of the hopper illustrated and having the weight distribution of the cart being primarily over the front axle the load is easily dumped. While the hopper shown has wide practical utility, it should be understood that the hopper may be detached from the frame and a hopper of a different size and shape may be put in its place where a different utility is desired.

The motive means 30 includes a motor 32 and a drive means mounted to the frame toward the forward end whereby the weight of said motive means is substantially above the drive wheels 16, 17. A motor mount plate 31 is secured to the forward end of frame 11. As particularly illustrated in FIG. 3, the motor 32, which may be a gasoline powered motor, is positioned beneath the front of hopper 25 and is secured on motor mount plate 31 so as to substantially balance the weight of the motor midway between drive wheels 16, 17.

The drive means includes output shaft 34 of motor 32 which drives output pulley 35 which is non-rotatably secured to the output shaft 34. As shown most clearly in FIGS. 4-6, a belt 38 interconnects output pulley 35 with pulley 36 to rotate power shaft 37. The rotation of power shaft 37 is converted in gear box to impart rotation to axle 26. The speed of cart 10 is determined by a throttle level 53 which places tension on belt 38 through control connecting rod 40 via a clutch. As shown in FIGS. 4-6, the clutch arrangement includes a pivotally mounted means 41 for holding tension pulley 42 against belt 38. Tension spring 39 connects pivot means 41 and frame support 43.

A handle 50 is attached to and extends rearwardly and upwardly the said frame 11. The handle 50 is attached to the rear of frame 11 on each side of the frame handle via handle supports 51, 52 which are permanently affixed to castor supports 23, 24. The handle may be two elongated handles such a found on a conventional wheelbarrow but preferably the handle is formed in the shape of a U as shown in FIG. 2.

Control means are provided and may be attached to the handle 50. In a preferred embodiment the control systems includes a control panel 51 attach to the side portions of the handle. The control means includes means for controlling the forward and rearward direction of the cart and for stopping the movement of the cart. As shown in FIG. 1, the control system includes gear lever 52 having forward, reverse and neutral positions, throttle lever 53, and off/on switch 54. There is also provided a dead man brake bar 56 connected to brake mechanism (not shown) through cables 56 and 57. The cables are held in place by ties 61. The gear lever 52 is connected to the power train through linkages 58, 59. The gear lever may have several gears.

The throttle lever 53 is suitably connected to the motor arrangement through cable 55. The cable 55 runs along handle 50 and frame 11 and may be held in place by ties 60. In an alternative embodiment the off/on switch may be a pull starter similar to though found on lawn mower motors.

The wheeled cart may also have a load dumping bumper 70 located forward of the frame whereby a portion of the weight of the cart and the load may rest thereon when a load is dumped and whereby the motive means is protected from bumping and the like. The bumper 70 is held in position by supports on both sides of the bumper shown in FIG. 1 as support 71.

While the preferred embodiments of this invention have been illustrated in detail, it should be readily apparent to those skilled in the art that other embodiments may be conceived and fabricated without departing from the spirit and scope of this invention.

That which is claimed is:

1. A wheeled cart for facilitating the transportation and delivery of a load of material comprising:
    an elongated frame;
    a pair of front wheels serving as drive wheels mounted to and supporting the forward end of said frame;
    a pair of rear wheels operatively engaged with and supporting the rear end of said frame said rear wheels being smaller than the front wheels;
    a hopper attached to said frame having a front portion of the hopper located above and over the front wheels whereby dumping a load is facilitated;
    motive means mounted on said frame adjacent said forward end of said frame;
    drive means connecting said motive means to said front wheels;
    a handle connected to and extending rearwardly and upwardly from said frame; and
    control means attached to said handle and connected to said motive means for controlling the operation of the motive means.

2. The wheeled cart according to claim 1 further comprising a load dumping bumper located forward of said frame whereby a portion of the weight of said cart and said load may rest thereon when a load is dumped.

3. The wheeled cart according to claim 1 wherein said control means includes means for effecting the forward and rearward movement of said cart and for stopping the movement of said cart.

4. The wheeled cart according to claim 1 wherein said drive wheels are located outside of said frame whereby the load is stabilized from side to side movement.

5. The wheeled cart according to claim 1 wherein said rear wheels are caster wheels.

6. The wheeled cart according to claim 1 wherein the weight of said motive means being above said pair of front wheels.

7. A wheeled cart for facilitating the transportation and delivery of a load of material comprising:
    an elongated frame;
    a pair of front wheels serving as drive wheels mounted to and supporting the forward end of said frame;
    a pair of rear caster wheels mounted directly under said frame, operatively engaged with and supporting the rear end of said frame said rear wheels being smaller than the front wheels;
    a hopper attached to said frame having a front portion of the hopper located above and over the front wheels whereby dumping a load is facilitated;
    motive means mounted on said frame adjacent said forward end of said frame with the weight of said motive means being above said pair of front wheels;
    drive means connecting said motive means to said front wheels;
    a handle connected to and extending rearwardly and upwardly from said frame;
    control means attached to said handle and connected to said motive means for controlling the operation of the motive means; and
    a load dumping bumper located forward of said frame whereby a portion of the weight of said cart and said load may rest thereon when a load is dumped.

* * * * *